(12) United States Patent
Ahn et al.

(10) Patent No.: US 9,925,929 B2
(45) Date of Patent: Mar. 27, 2018

(54) APPARATUS FOR EJECTING ELECTRIC DVD DECK

(71) Applicants: Hyundai Motor Company, Seoul (KR); Kia Motors Corporation, Seoul (KR); Hyundai Mobis Co., Ltd., Seoul (KR)

(72) Inventors: Gye Young Ahn, Whasung-Si (KR); Hong Sik Chang, Whasung-Si (KR); Jae Whoan Park, Whasung-Si (KR)

(73) Assignees: Hyundai Motor Company, Seoul (KR); Kia Motors Corporation, Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/351,163

(22) Filed: Nov. 14, 2016

(65) Prior Publication Data

US 2017/0349114 A1 Dec. 7, 2017

(30) Foreign Application Priority Data

Jun. 1, 2016 (KR) .................. 10-2016-0067931

(51) Int. Cl.
*H02K 7/10* (2006.01)
*G11B 17/22* (2006.01)
(Continued)

(52) U.S. Cl.
CPC .......... *B60R 11/0211* (2013.01); *B60K 35/00* (2013.01); *H02K 7/1166* (2013.01); *B60K 2350/106* (2013.01)

(58) Field of Classification Search
CPC . G11B 17/223; G11B 23/0323; G11B 15/688; G11B 17/225; G11B 17/26;
(Continued)

(56) References Cited

U.S. PATENT DOCUMENTS

| | | | | |
|---|---|---|---|---|
| 5,101,388 A | * | 3/1992 | Fushimi | G11B 17/223 360/92.1 |
| 5,671,198 A | * | 9/1997 | Tsuchiya | G11B 17/30 369/30.32 |

(Continued)

FOREIGN PATENT DOCUMENTS

| | | |
|---|---|---|
| JP | 2012-025212 A | 2/2002 |
| KR | 10-1998-016607 A | 6/1998 |

(Continued)

*Primary Examiner* — Paul Ip
(74) *Attorney, Agent, or Firm* — Morgan, Lewis & Bockius LLP

(57) ABSTRACT

An apparatus for ejecting an electric DVD deck may include a housing fixedly disposed in an internal space of a vehicle body trim panel, the DVD deck disposed in a lower portion of the housing, an actuator disposed between the housing and the DVD deck such that the DVD deck is ejected from the internal space of the vehicle body trim panel by upward and downward movement of the DVD deck, a sensor to detect upward and downward movement of the DVD deck, and a control module to control the actuator, in which, when a signal of the sensor is not received within a reference time during operation of the actuator, the control module may allow the DVD deck to return to a movement start position.

9 Claims, 8 Drawing Sheets

(51) Int. Cl.
  *B60R 11/02* (2006.01)
  *H02K 7/116* (2006.01)
  *B60K 35/00* (2006.01)

(58) Field of Classification Search
  CPC ......... G11B 17/30; G11B 17/05; G11B 31/02;
       G11B 33/144; G11B 19/022; G11B
       2220/2545; G11B 2220/90; G11B 27/002;
       G11B 27/105
  USPC ............ 318/15, 560, 632; 369/30.32, 53.21;
       720/606
  See application file for complete search history.

(56) References Cited

U.S. PATENT DOCUMENTS

| | | | | |
|---|---|---|---|---|
| 5,757,738 A * | 5/1998 | Ohba | ................... | G11B 15/688 |
| | | | | 312/9.31 |
| 5,815,468 A * | 9/1998 | Muramatsu | .......... | G11B 19/022 |
| | | | | 369/12 |
| 5,936,918 A * | 8/1999 | Ohba | ................... | G11B 15/688 |
| | | | | 369/30.31 |
| 6,026,063 A * | 2/2000 | Ohba | ................... | G11B 15/688 |
| | | | | 369/30.28 |
| 7,006,409 B2 * | 2/2006 | Togashi | ................ | G11B 17/30 |
| | | | | 369/30.38 |
| 7,583,567 B2 * | 9/2009 | Ogasawara | ............ | G11B 31/02 |
| | | | | 369/30.27 |
| 8,218,411 B2 * | 7/2012 | Stanley | ................ | G11B 33/144 |
| | | | | 369/53.21 |
| 8,321,880 B2 * | 11/2012 | Takasawa | .......... | G11B 23/0323 |
| | | | | 369/30.53 |
| 8,589,961 B2 * | 11/2013 | Takasawa | .......... | G11B 23/0323 |
| | | | | 369/30.68 |
| 2004/0027934 A1 * | 2/2004 | Togashi | ................ | G11B 17/30 |
| | | | | 369/30.84 |
| 2006/0181969 A1 * | 8/2006 | Stanley | .................. | G11B 17/05 |
| | | | | 369/30.32 |
| 2007/0047399 A1 * | 3/2007 | Ogasawara | ............ | G11B 31/02 |
| | | | | 369/30.32 |
| 2011/0296445 A1 * | 12/2011 | Takasawa | ............ | G11B 17/223 |
| | | | | 720/606 |
| 2011/0296446 A1 * | 12/2011 | Takasawa | ............ | G11B 17/223 |
| | | | | 720/621 |

FOREIGN PATENT DOCUMENTS

| | | |
|---|---|---|
| KR | 10-2004-0008412 A | 1/2004 |
| KR | 10-2009-0004204 A | 1/2009 |
| KR | 10-2014-0023747 A | 2/2012 |
| KR | 10-1172238 B1 | 8/2012 |
| KR | 10-2014-0080573 A | 7/2014 |

* cited by examiner

APPARATUS FOR EJECTING ELECTRIC DVD DECK

CROSS-REFERENCE TO RELATED APPLICATION

The present application claims priority to Korean Patent Application No. 10-2016-0067931, filed Jun. 1, 2016, the entire contents of which is incorporated herein for all purposes by this reference.

BACKGROUND OF THE INVENTION

Field of the Invention

The present invention relates to an apparatus for ejecting an electric DVD deck. More particularly, to an apparatus for ejecting an electric DVD deck, which is configured to separate a DVD deck equipped with a DVD player from a stereo so as to eject the DVD deck from an internal space of a vehicle body trim panel.

Description of Related Art

In general, a stereo, a DVD (Digital Versatile Disk) player, and the like are provided in front of a front seat in a vehicle body. Typically, the DVD player and the stereo are integrally formed and installed in a center fascia.

When the DVD player and the stereo are integrally formed and installed in the center fascia at the front of the vehicle body, as described above, the space utilization of the center fascia may deteriorate, and a crash pad (dashboard) may lack openness due to the increased size of the center fascia.

In order to overcome these drawbacks, the DVD player and the stereo are separated from each other and are formed separately. In this case, the DVD player is conventionally built in a console between a driver seat and a passenger seat or in a glove box in front of the passenger seat.

However, when the DVD player is built in the console or the glove box, as described above, the console or glove box may have a reduced storage space, and particularly passengers may be considerably injured in the event of a collision between their knees and the glove box.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for ejecting an electric DVD deck, which is configured to separate a DVD deck equipped with a DVD player from a stereo so as to install the DVD deck at the front of a vehicle body. Consequently, it is possible to prevent a passenger's knee injury and a reduction in storage space in a vehicle interior due to the installation structure of the DVD deck and to enhance convenience for use.

According to various aspects of the present invention, an apparatus for ejecting an electric DVD deck may include a housing fixedly disposed in an internal space of a vehicle body trim panel, the DVD deck disposed in a lower portion of the housing, an actuator disposed between the housing and the DVD deck such that the DVD deck is ejected from the internal space of the vehicle body trim panel by upward and downward movement of the DVD deck, a sensor to detect upward and downward movement of the DVD deck, and a control module to control the actuator, in which when a signal of the sensor is not received within a reference time during operation of the actuator, the control module may allow the DVD deck to return to a movement start position.

The actuator may include a motor to generate power for the movement of the DVD deck, a power transmitter disposed between the motor and the DVD deck to transmit the power of the motor to the DVD deck, and a drive link disposed between the power transmitter and the DVD deck to move up and down the DVD deck by the power transmitted from the power transmitter.

The power transmitter may include a worm gear rotatably connected on a same axis as the motor, spur gearing connected to transmit the power of the motor to the drive link, and a helical gear connected between the worm gear and the spur gearing to transmit the power of the motor to the spur gearing, in which a friction pad may be disposed between the helical gear and the spur gearing to transmit power therebetween, and slip occurs between the helical gear and the spur gearing when a load greater than frictional force of the friction pad may be input.

The DVD deck may be placed at a descent start point, the drive link may be stopped at a position, in which an upper end hinge part fastened to the power transmitter rotates in a rotation direction for ascent of the DVD deck on a vertical line passing through a center of rotation of the drive link.

The actuator may include a base plate supporting the motor and the power transmitter, and the base plate may be formed with a stopper to prevent the drive link, which rotates in the rotation direction for the ascent of the DVD deck, from further rotating.

The housing may include therein a housing bushing which moves up and down along with the DVD deck, the housing bushing may be formed with a plurality of light blocking parts disposed in an upward and downward movement direction of the housing bushing, and the control module may determine whether the movement of the DVD deck is abnormal, based on a signal of the sensor generated according to movement of the light blocking parts.

The housing bushing may be formed with a guide rib for preventing the movement of the housing busing.

When insertion of a DVD disc is determined to be completed, based on a DVD player state signal during insertion of the DVD disc into a DVD player mounted in the DVD deck, the control module may allow the DVD deck to automatically return to the internal space of the vehicle body trim panel.

The control module may allow the DVD deck to move up and down based on a signal of an operation button, and the operation button is provided in a glove box.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
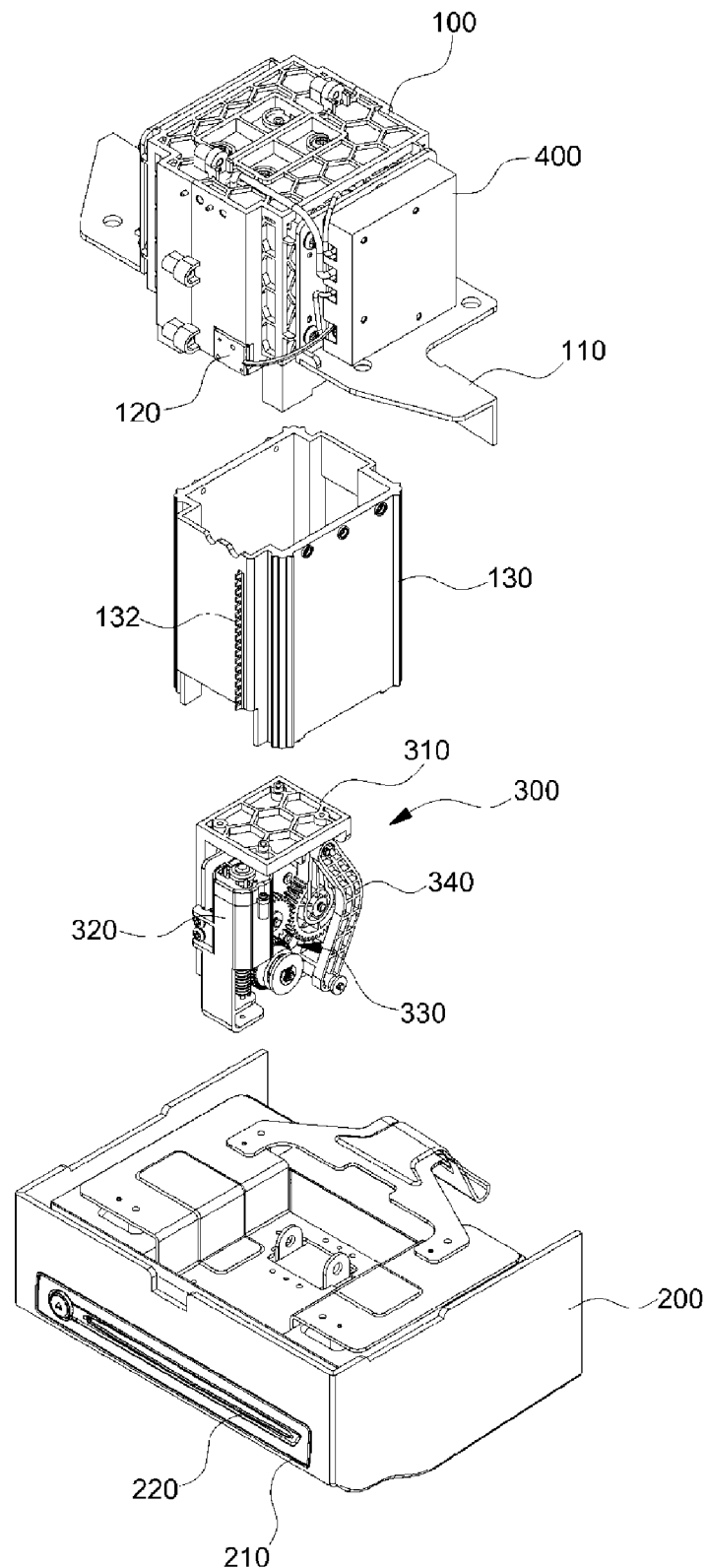
FIG. 1 is an exploded perspective view illustrating an apparatus for ejecting an electric DVD deck according to various embodiments of the present invention.
Figure 2:
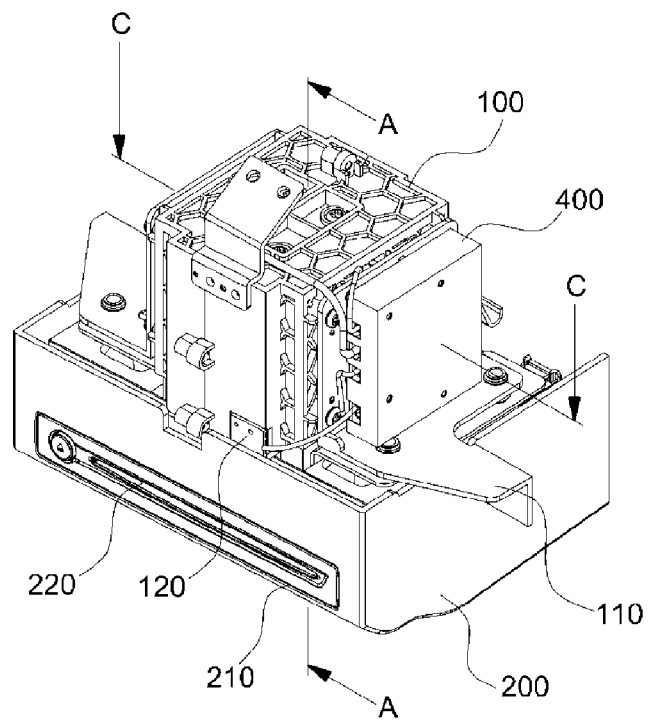
FIG. 2 is an assembled perspective view illustrating the apparatus for ejecting an electric DVD deck according to various embodiments of the present invention.

As illustrated in FIGS. 1 and 2, an apparatus for ejecting an electric DVD deck according to various embodiments of the present invention includes a housing 100 which is fixedly disposed in the internal space of a vehicle body trim panel 10 (see FIG. 8), an actuator 300 which is installed between the housing 100 and a DVD deck 200 to move up and down the DVD deck 200, and a control module 400 which controls the operation of the actuator 300.

The housing 100 is formed so as to enclose and protect the actuator 300 disposed at the upper end of the DVD deck 200, and includes a mounting plate 110 which enables the housing 100 to be fixed and supported in the internal space of the vehicle body trim panel 10.

The mounting plate 110 is coupled to a vehicle body structure, a vehicle body panel, or the like, which is fixedly placed in the internal space of the vehicle body trim panel 10, and enables the housing 100 to be fixed and supported in the internal space of the vehicle body trim panel 10.

Here, the vehicle body trim panel 10 may be a crash pad disposed at the front of a vehicle interior. The housing 100 may be fixedly disposed in an internal space (or a lower space) beneath the crash pad, and the DVD deck 200 disposed in the lower portion of the housing 100 is located above a glove box 20 (see FIG. 8), which is disposed beneath the lower space of the crash pad, in the state in which the DVD deck 200 is not ejected. Accordingly, the DVD deck 200 does not protrude downward from the vehicle body trim panel 10, i.e. the crash pad, even though the glove box 20 is opened when the DVD deck 200 is not ejected (see FIG. 8).

The DVD deck 200 has a port 210 for the entry and exit of DVD discs, a DVD player 220 for playing DVD discs is installed in the DVD deck 200, and a DVD disc is inserted into the DVD player 220 through the port 210. The DVD deck 200 is disposed to be movable up and down for its downward ejection and upward return in the internal space of the vehicle body trim panel 10.

Figure 3:
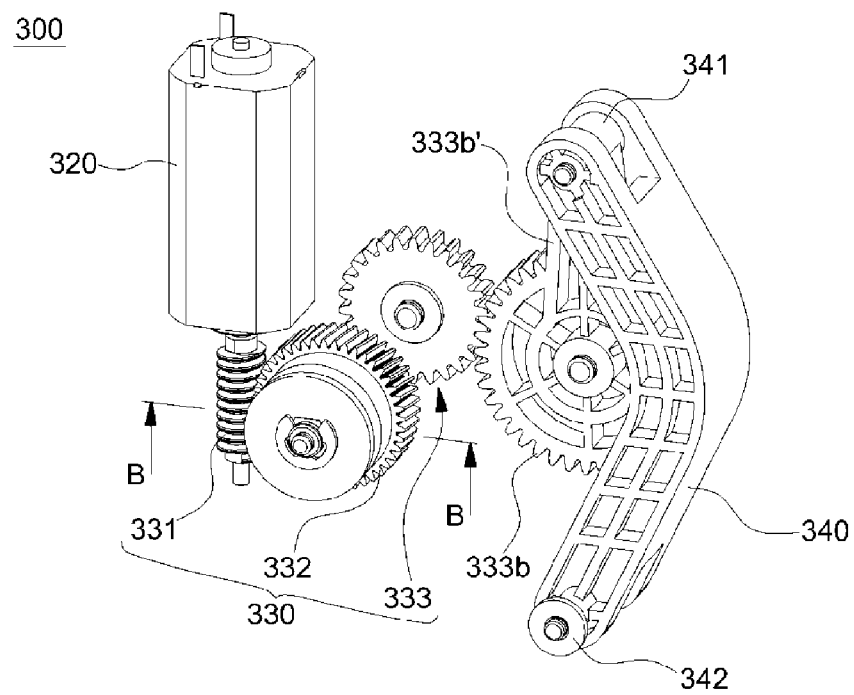
FIG. 3 is a perspective view illustrating an actuator of the apparatus for ejecting an electric DVD deck according to various embodiments of the present invention.
Figure 4:
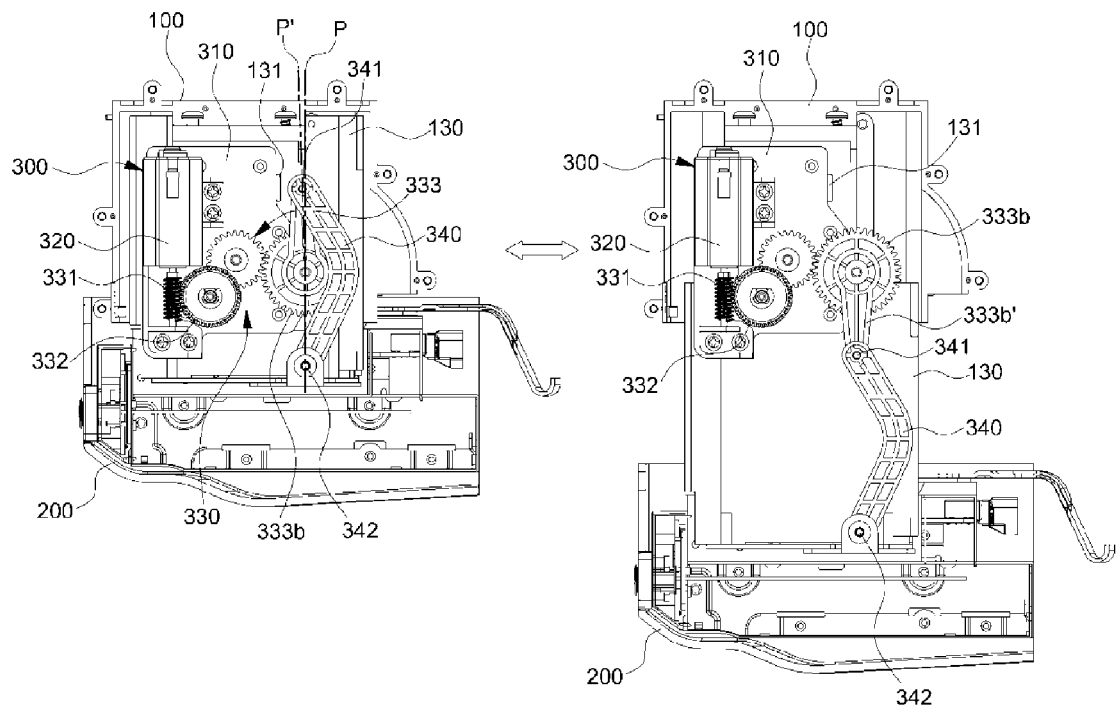
FIG. 4 is a view taken along line A-A of FIG. 2 to illustrate an operation state when a DVD deck is ejected.

Referring to FIGS. 3 and 4, the actuator 300, which supports the DVD deck 200 such that the DVD deck is movable up and down, is fixedly disposed in the housing 100.

The actuator 300 provides power for the DVD deck 200 entering and exiting from the internal space of the vehicle body trim panel 10. The actuator 300 includes a base plate 310 which is fixedly mounted in the housing 100, a motor 320 which is mounted to and supported by the base plate 310 so as to generate power for upward and downward movement of the DVD deck, and a power transmitter 330 and a drive link 340 which serve to transmit the power of the motor 320.

The motor 320 is driven by a power source applied thereto to generate power for upward and downward movement of the DVD deck 200, and may be a bidirectional motor which is rotatable in forward and reverse directions depending on the direction of application of a power source.

The power transmitter 330 is operably installed to and supported by the base plate 310, and is simultaneously installed between the motor 320 and the DVD deck 200 so as to reduce and transmit the rotation power/speed (rpm) of the motor 320. The power transmitter 330 includes a worm gear 331 which is connected to the motor 320 to rotate on the same axis as the axis of rotation of the motor 320, a helical gear 332 which is connected between the worm gear 331 and spur gearing 333 so as to transmit the rotation power of the motor, and the spur gearing 333 which rotatably moves the drive link 340 by the rotation power transmitted from the helical gear 332.

Figure 5:
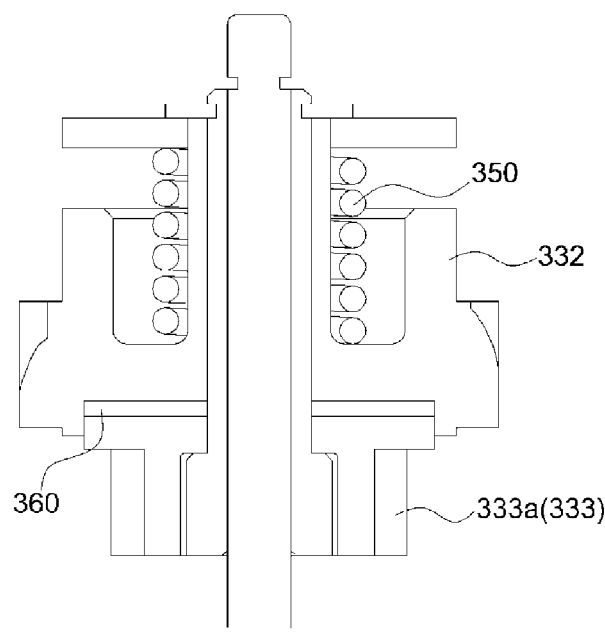
FIG. 5 is a view taken along line B-B of FIG. 3.

In this case, a friction pad 360 is disposed between a first spur gear 333a of the spur gearing 333 and the helical gear 332, and the helical gear 332 is pressed against the first spur gear 333a by the spring force of a compression spring 350 so that the rotary power of the helical gear 332 is transmitted to the spur gearing 333 by the surface frictional force of the friction pad 360, as illustrated in FIG. 5.

The spur gearing 333 is connected to the drive link 340 so as to transmit the power of the motor thereto. Specifically, the spur gearing 333 is configured by combining three spur gears having different sizes in addition to the first spur gear 333a. Among them, a last spur gear 333b fastened to the drive link 340 is provided with a swivel arm 333b' which is fastened to an upper end hinge part 341 of the drive link 340 and protrudes radially.

The drive link 340 is installed between the power transmitter 330 and the DVD deck 200 and is rotatably moved so as to move up and down the DVD deck 200 by the power transmitted from the power transmitter 330. Upper and lower end hinge parts 341 and 342 formed at both ends of the drive link 340 are fastened to the swivel arm 333b' of the last spur gear 333b and the upper end of the DVD deck 200, respectively, and thus the DVD deck 200 moves up and down when the drive link 340 is rotatably moved by the power of the motor, as illustrated in FIG. 4.

In addition, the drive link 340 is stopped at a position, in which the upper end hinge part 341 fastened to the spur gearing 333 of the power transmitter 330 is rotated at a certain angle or more in a rotation direction (e.g. in a counterclockwise direction) for the upward return of the DVD deck 200 on a vertical line passing through the center of rotation of the drive link 340, in consideration of a vertical load applied to the upper end hinge part 341 of the drive link 340 in the state in which the DVD deck 200 is placed at a descent start point (or at an ejection start point) as illustrated in the left drawing (the state before the DVD deck is ejected) of FIG. 4. Consequently, the drive link 340 may be self-locked by the center of gravity.

In more detail, when the DVD deck 200 is placed at the descent start point before it is ejected from the internal space of the vehicle body trim panel 10, the drive link 340 is rotated at a certain angle or more in the counterclockwise direction from the center of rotation thereof, which is indicated by reference numeral P in FIG. 4, and is then stopped at a point indicated by reference numeral P'. Consequently, the drive link 340 may be obliquely arranged to be self-locked.

Since the drive link 340 is self-locked, it is possible to prevent the drive link 340 from unintentionally rotating (rotating for the descent of the DVD deck) due to external shock such as traveling vibration. In addition, in order to prevent the drive link (i.e. the self-locked drive link), which is rotated in the rotation direction for the upward return of the DVD deck 200, from further rotating in the rotation (counterclockwise) direction for the upward movement of the DVD deck 200 from the point indicated by reference numeral P', the base plate 310 is formed with a stopper 131 for preventing and restricting the rotation of the drive link 340.

When a load greater than the frictional force of the friction pad 360 occurs in the power transmitter 330 due to external force during the upward and downward movement of the DVD deck 200, power is not transmitted between the helical gear 332 and the spur gearing 333 by the friction pad 360, thereby preventing the overload of the motor.

That is, when there is concern about the overload of the motor due to a load greater than a predetermined surface frictional force, the friction pad 360 causes slip to occur between the helical gear 332 and the first spur gear 333a so as to prevent the overload of the motor due to the operational error of the DVD deck 200.

To this end, the slip frictional force of the friction pad 360 is set to be greater than a certain value, compared to the movement load of the DVD deck 200.

The friction pad 360 performs power transmission and is used as one of double safety devices for preventing the overload of the motor. In addition, a sensor 120 is provided as the other of double safety devices for preventing the overload of the motor.

Figure 6A:
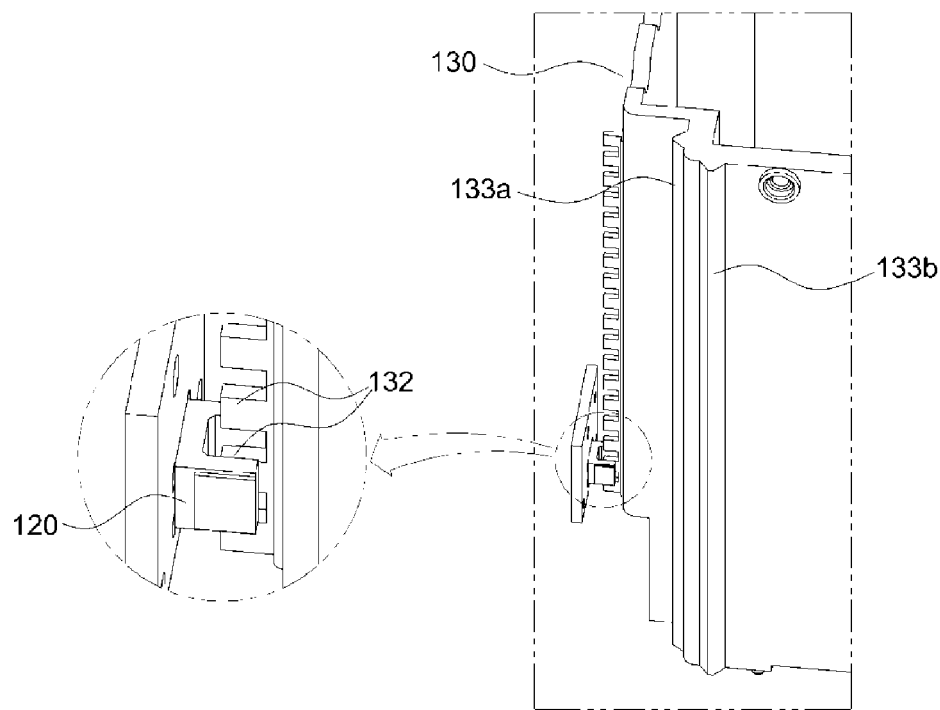
FIG. 6A is a view illustrating the arrangement of a sensor disposed in a housing and light blocking parts formed in a housing bushing according to various embodiments of the present invention.

The sensor 120 serves to detect whether the DVD deck 200 moves up and down. As illustrated in FIG. 6A, the sensor 120 is fixedly installed on the inner wall of the housing 100 to detect the position movement of a housing bushing 130 moving up or down along with the DVD deck 200.

The housing bushing 130 is slidably built in the housing 100 and is seated on the upper end of the DVD deck 200, thereby moving along with the DVD deck 200 when the DVD deck 200 moves up and down.

Light blocking parts 132, each having a protrusion shape, are formed on the outer surface of the housing bushing 130 to protrude in a line in the movement direction of the housing bushing 130. The sensor 120 detects the upward and downward movement of the housing bushing 130 through the light blocking parts 132.

Figure 6B:
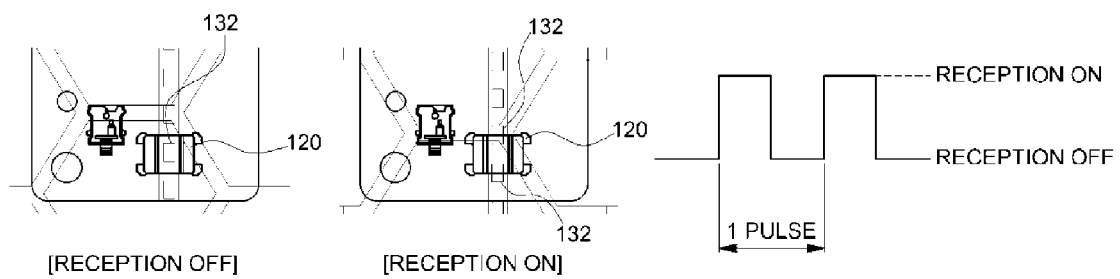
FIG. 6B is a view for illustrating a method of detecting the optical detection signal of the sensor according to various embodiments of the present invention.

To this end, the sensor 120 may be a photo sensor which detects light using a light emitting element and a light receiving element. As illustrated in FIG. 6B, an optical detection signal (or signal detecting the movement of the DVD deck) is not detected when the light blocking parts 132 pass through the sensor 120 according to the upward and downward movement of the housing bushing 130, but an optical detection signal is detected when the sensor 120 is located between the light blocking parts 132.

Accordingly, the sensor 120 may be set to detect optical detection signals on a regular cycle by arranging the light blocking parts 132 on the housing bushing 130 at regular intervals.

Thus, the control module 400 may determine whether the DVD deck 200 is abnormally moved based on the optical detection signal (signal detecting the movement of the DVD deck) of the sensor 120. Specifically, when the optical detection signal of the sensor 120 is received within a reference time, the control module 400 determines that the DVD deck 200 is normally moved up and down. However, when the optical detection signal of the sensor 120 is not received within the reference time, the control module 400 determines that the DVD deck 200 is abnormally moved up and down.

In other words, the control module 400 may determine whether the upward and downward movement mechanism of the DVD deck 200 is normally operated based on the optical detection signal of the sensor 120 when the DVD deck 200 moves up and down. When the optical detection signal is not received within the reference time due to external force or the like generated during the upward and downward movement of the DVD deck 200, the control module 400 determines that an error occurs in the operation of the DVD deck 200 and initializes the DVD deck 200 such that the DVD deck 200 returns to a movement start position (descent start position or ascent start position).

That is, when the optical detection signal (signal detecting the movement of the DVD deck) of the sensor 120 is not received repeatedly within the reference time during the upward and downward movement of the DVD deck 200 by the driving of the actuator 300, the control module 400 determines that an error occurs in operation mechanism for the upward and downward movement of the DVD deck 200, and allows the DVD deck 200 to return to the movement start position.

Figure 7:
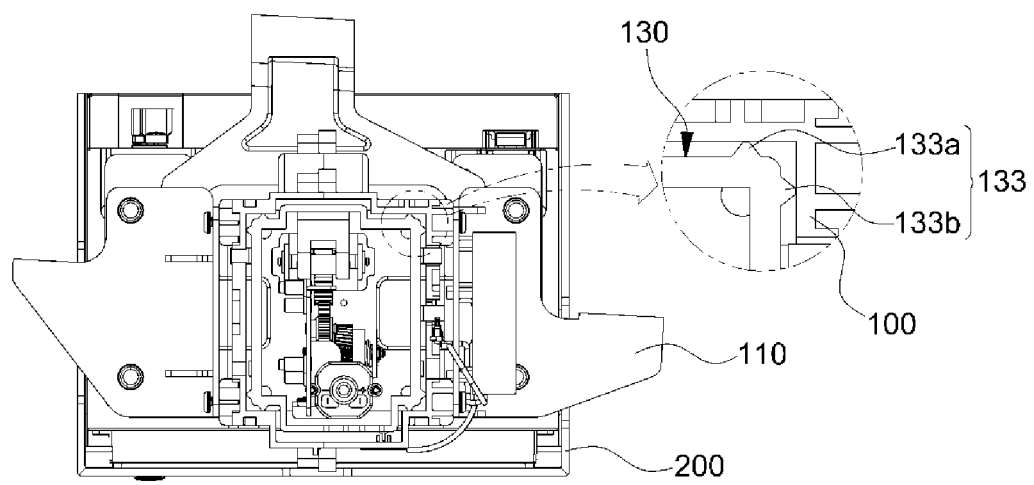
FIG. 7 is a view taken along line C-C of FIG. 2.

As illustrated in FIG. 7, the housing bushing 130 is formed with a guide rib 133 for preventing the movement of the housing busing 130 assembled in the housing 100.

The guide rib 133 includes a front-rear guide rib 133a for preventing the forward and rearward movement of the housing bushing 130, and a left-right guide rib 133b for preventing the lateral movement of the housing bushing 130. The guide rib 133 protrudes from the corner of the outer surface of the housing bushing 130 and simultaneously comes into contact with the inner wall of the housing 100, thereby preventing the movement of the housing bushing 130 due to external force and the upward and downward movement of the DVD deck 200.

In addition, the control module 400 may allow the DVD deck 200 to descend toward the glove box 20 or allow the DVD deck 200 to return upward to the internal space of the vehicle body trim panel 100, based on signals according to the operation of an operation button 140 by a user. In this case, the operation button 140 may be installed in the glove box 20 (see FIG. 8).

Figure 8:
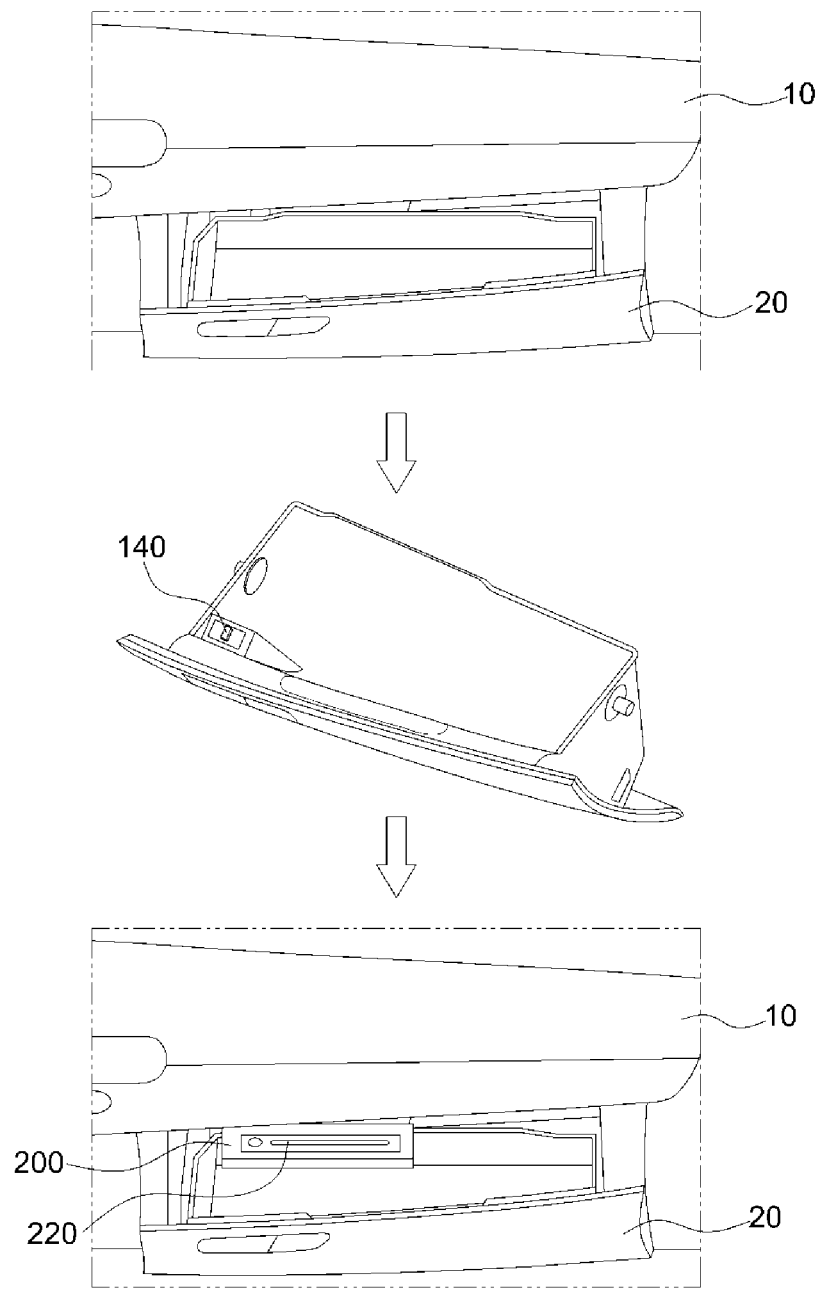
FIG. 8 is a view illustrating an example of use of the apparatus for ejecting an electric DVD deck according to various embodiments of the present invention.

As illustrated in FIG. 8, when the glove box 20 is opened and the operation button 140 is pressed, the control module 400, which receives a HIGH signal from the operation button 140, allows the DVD deck 200 to descend and be ejected from the lower side of the internal space of the vehicle body trim panel 10 by driving the actuator 300. The actuator 300 is driven again by inserting a disc into the DVD player 220 of the ejected DVD deck 200 or operating the operation button 140, and the DVD deck 200 returns upward to the internal space of the vehicle body trim panel 10.

In more detail, when a disc is inserted into the DVD player 220 through the port 210 of the DVD deck 200, the DVD deck 200 automatically returns within a certain time (certain time after the insertion of the click) based on a signal indicative of operation of the DVD player 220. When a disc is not inserted into the DVD player 220, the DVD deck 200 returns upward based on the signal of the operation button 140.

Hereinafter, the method of controlling the movement of the DVD deck 200 by the control module 400 in order to prevent the malfunction of the DVD deck 200 and thus the overload of the motor will be described with reference to FIG. 9.

When external force is applied during the upward and downward movement of the DVD deck 200 and the DVD deck 200 does not reach a target position within a reference time, an optical detection signal (signal detecting the movement of the DVD deck) is not generated from the sensor 120. Thus, the control module 400, which does not receive the optical detection signal, operates a separate alarm means (LED or buzzer) and informs a user of the operation error of the DVD deck 200.

Figure 9:
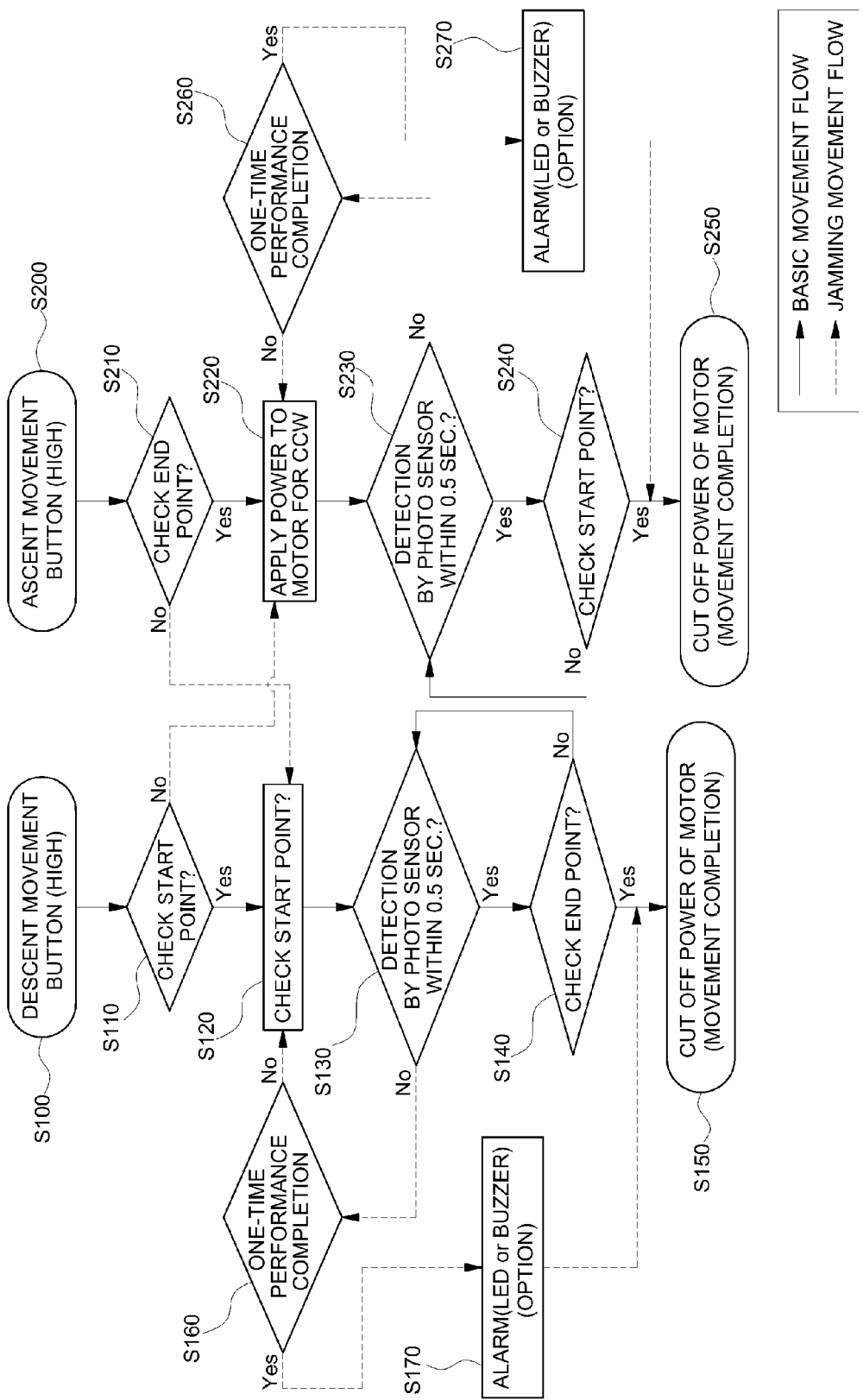
FIG. 9 is a flowchart illustrating a control method for malfunction prevention using the sensor of the apparatus for ejecting an electric DVD deck according to various embodiments of the present invention.

In more detail, referring to FIG. 9, when a signal (HIGH signal) for the descent of the DVD deck 200 is first input from the operation button 140 (S100), the control module 400 determines whether the DVD deck 200 is placed at a descent start point (at a movement start position) using a position sensor built therein (S110). When the DVD deck 200 is not placed at the descent start point, it is determined that the DVD deck 200 is abnormal. Thus, a power source is applied to the motor 320 for the counterclockwise (or reverse) rotation thereof (S220) so that the DVD deck 200 ascends to the descent start point.

When the DVD deck 200 is determined to be placed at the descent start point, a power source is applied to the motor 320 for the clockwise (or forward) rotation thereof (S120) so that the DVD deck 200 descends. Then, it is continuously determined whether the optical detection signal of the sensor 120 is received within a reference time after the driving of the motor (S130).

When the optical detection signal of the sensor 120 for detecting the descent of the DVD deck 200 is received within the reference time, it is determined whether the DVD deck reaches a descent end point using the position sensor of the control module 400 (S140). When the DVD deck 200 is determined to reach the descent end point, the power of the motor is cut off (S150) so that the descent of the DVD deck 200 is ended.

The control module 400 repeatedly determines whether the optical detection signal of the sensor 120 is received until the DVD deck 200 reaches the descent end point (S130). When the optical detection signal is not received within the reference time, it is determined that the movement of the DVD deck 200 is abnormal, with the consequence that an alarm is operated (S170) and the power of the motor is cut off (S150). Alternatively, when the optical detection signal is not received within the reference time, it is determined that the movement of the DVD deck 200 is abnormal, with the consequence that the alarm is operated (S170) and the power source is simultaneously applied to the motor 320 for the counterclockwise rotation thereof so that the DVD deck 200 returns to the descent start point.

However, when it is determined whether the signal of the sensor 120 is first received (once in the first stage) after the power source is applied to the motor 320 (S160), the power of the motor is continuously applied even though the optical detection signal is not received within the reference time.

When a signal (HIGH signal) for the ascent (return) of the DVD deck 200 is input from the operation button 140 (S200) in the state in which the DVD deck 200 is ejected downward, the control module 400 determines whether the DVD deck 200 is placed at a descent end point, i.e. at an ascent start point (movement start position), using the position sensor built therein (S210). When the DVD deck 200 is not placed at the descent end point (ascent start point), it is determined that the DVD deck 200 is abnormal. Thus, a power source is applied to the motor 320 for the clockwise (or forward) rotation thereof (S120) so that the DVD deck 200 descends to the ascent start point.

When the DVD deck 200 is determined to be placed at the ascent start point, a power source is applied to the motor 320 for the counterclockwise (or reverse) rotation thereof (S220) so that the DVD deck 200 ascends. Then, it is repeatedly determined whether the optical detection signal of the sensor is received within a reference time after the driving of the motor 320 (S230).

When the optical detection signal of the sensor 120 for detecting the ascent of the DVD deck 200 is repeatedly received within the reference time, it is determined whether the DVD deck reaches an ascent end point, i.e. a descent start point, using the position sensor of the control module 400 (S240). When the DVD deck 200 is determined to reach the ascent end point (movement end position), the power of the motor is cut off (S250) so that the ascent of the DVD deck 200 is ended.

The control module 400 repeatedly determines whether the optical detection signal of the sensor 120 is received until the DVD deck 200 reaches the ascent end point (descent start point) (S230). When the optical detection signal is not received within the reference time, it is determined that the movement of the DVD deck 200 is abnormal, with the consequence that an alarm means is operated (S270) and the power of the motor is cut off (S250). Alternatively, when the optical detection signal is not received within the reference time, it is determined that the movement of the DVD deck 200 is abnormal, with the consequence that the alarm means is operated (S270) and the power source is simultaneously applied to the motor 320 for the clockwise rotation thereof so that the DVD deck 200 returns to the ascent start point (movement start position).

However, when it is determined whether the signal of the sensor is first received (once in the first stage) after the power source is applied to the motor 320 (S260), the power of the motor is continuously applied even though the optical detection signal is not received within the reference time.

By controlling the upward and downward movement of the DVD deck 200 as described above, it is possible to prevent the overload of the motor due to an error in the operation mechanism for the upward and downward movement of the DVD deck 200.

Hereinafter, the control method for realizing the automatic return of the DVD deck 200 will be described with reference to FIG. 10.

When the DVD deck 200 is not returned upward and the glove box 20 is closed in the state in which the glove box 20 is opened and the DVD deck 200 descends and is ejected, the glove box 20 collides with the DVD deck 200 while being closed.

For a fool-proof function that prevents issues due to the mal-operation of a user, the control module 400 may realize the automatic return of the DVD deck 200 through wire communication with a controller 500 (e.g. a head unit of AVN) provided in the vehicle when a DVD disc is inserted into the DVD player 220.

Figure 10:
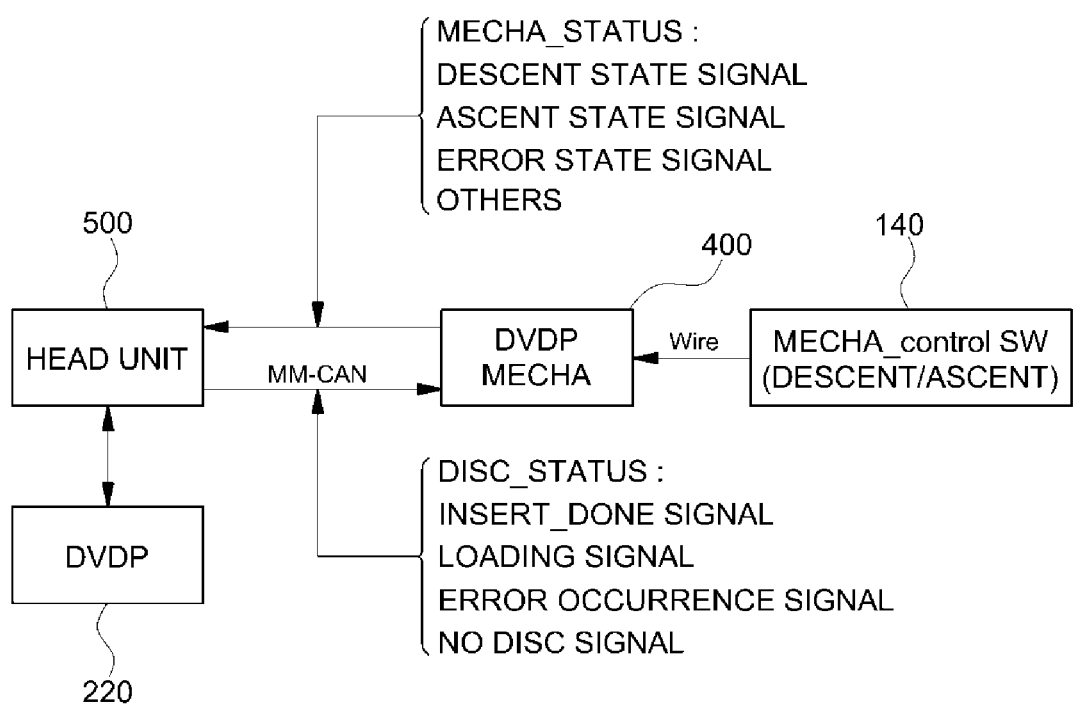
FIG. 10 is a block diagram for illustrating a control method for automatically returning the DVD deck of the apparatus for ejecting an electric DVD deck according to various embodiments of the present invention.

In more detail, referring to FIG. 10, when an operation signal for the upward and downward movement of the DVD deck 200 is input from the operation button 140, the control module 400 transmits an ascent/descent state signal (a descent state signal or an ascent state signal), an error state signal, and other signals, as the state information of the DVD deck 200, to the head unit.

For example, the control module 400 transmits the ascent state signal to the head unit when the DVD deck 200 is placed at the descent start point, and transmits the descent stage signal to the head unit 500 when the signal of the operation button 140 is input in the state in which the DVD deck 200 is placed at the descent start point. In addition, the control module 400 may also transmit the descent state signal to the head unit 500 when the DVD deck 200 is placed at the descent end point.

In this case, the descent state signal is a signal indicative of the state in which the DVD deck 200 is placed at the descent end point so that a DVD disc may be inserted into and ejected from the DVD player 220. The ascent state signal is a signal indicative of the state in which the DVD deck 200 is placed at the descent start point so that a DVD disc may not be inserted into and ejected from the DVD player 220.

The error occurrence signal is a signal related to whether an error occurs in the operation mechanism for the upward and downward movement of the DVD deck 200, and is transmitted to the head unit 500.

The head unit 500 transmits the state information of the DVD player to the control module 400, based on signals transmitted from the controller included in the DVD player 220. Specifically, DVD player state signals, such as an insert done signal, a loading signal, an error occurrence signal, and a no disc signal, are transmitted to the control module.

The insert done signal is a signal indicative of the state in which the insertion of a disc to the DVD player 220 is completed. The loading signal is a signal indicative of the state in which a disc is being inserted into the DVD player 220. The error occurrence signal is a signal indicative of the error state of a disc and/or the error occurrence state of the DVD player 220. The no disc signal is a signal indicative of the state in which a disc is not inserted into the DVD player 220.

The control module 400 may determine whether the insertion of a DVD disc is completed and an error occurs, based on the DVD player state signals transmitted from the head unit 500 when the DVD disc is inserted into the DVD player 220. When the insertion of the DVD disc is determined to be completed, the DVD deck 200 automatically returns to the internal space of the vehicle body trim panel 10. Consequently, it is possible to prevent the collision between the glove box 20 and the DVD deck 200 due to the mal-operation of the user.

As is apparent from the above description, an apparatus for ejecting an electric DVD deck according to various embodiments of the present invention may have the following effects.

A DVD deck equipped with a DVD player is stored in the internal space of a vehicle body trim panel (in a space above a glove box) when the DVD player is not used, and the DVD deck is ejected toward the glove box only when the DVD player is used. Therefore, it is possible to reduce space constraints on the installation of the DVD deck and package the DVD deck.

Since the ejection of the DVD deck is electrically controlled, it is possible to enhance convenience for use.

It is possible to remove elements causing a passenger's knee injury in the event of a collision.

It is possible to improve marketability by application of a fail-safe function in consideration of the malfunction of the DVD deck.

Since the upward and downward movement mechanism of the DVD deck is realized using only one motor, it is possible to simplify a system and reduce costs.

Since the DVD deck is separated from a stereo and installed in the internal space of a crash pad, the size of a center fascia can be reduced. Therefore, it is possible to improve the openness of the crash pad and the degree of design freedom.

Since the DVD deck is disposed and concealed in the space above the glove box (in the internal space of the crash pad), the glove box can be used without a reduction in space utilization.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for ejecting an electric DVD deck, comprising:
   a housing fixedly disposed in an internal space of a vehicle body trim panel;
   the DVD deck disposed in a lower portion of the housing;
   an actuator disposed between the housing and the DVD deck such that the DVD deck is ejected from the internal space of the vehicle body trim panel by upward and downward movement of the DVD deck;
   a sensor to detect upward and downward movement of the DVD deck; and
   a control module to control the actuator,
   wherein, when a signal of the sensor is not received within a reference time during operation of the actuator, the control module allows the DVD deck to return to a movement start position.

2. The apparatus of claim 1, wherein the actuator comprises:
   a motor to generate power for the movement of the DVD deck;
   a power transmitter disposed between the motor and the DVD deck to transmit the power of the motor to the DVD deck; and
   a drive link disposed between the power transmitter and the DVD deck to move up and down the DVD deck by the power transmitted from the power transmitter.

3. The apparatus of claim 2, wherein the power transmitter comprises:
   a worm gear rotatably connected on a same axis as the motor;
   spur gearing connected to transmit the power of the motor to the drive link; and
   a helical gear connected between the worm gear and the spur gearing to transmit the power of the motor to the spur gearing,
   wherein a friction pad is disposed between the helical gear and the spur gearing to transmit power therebetween, and slip occurs between the helical gear and the spur gearing when a load greater than frictional force of the friction pad is input.

4. The apparatus of claim 2, wherein, when the DVD deck is placed at a descent start point, the drive link is stopped at a position, in which an upper end hinge part fastened to the power transmitter rotates in a rotation direction for ascent of the DVD deck on a vertical line passing through a center of rotation of the drive link.

5. The apparatus of claim 4, wherein the actuator comprises a base plate supporting the motor and the power transmitter, and the base plate is formed with a stopper to prevent the drive link, which rotates in the rotation direction for the ascent of the DVD deck, from further rotating.

6. The apparatus of claim 1, wherein the housing includes therein a housing bushing which moves up and down along with the DVD deck, the housing bushing is formed with a plurality of light blocking parts arranged in an upward and downward movement direction of the housing bushing, and the control module determines whether the movement of the DVD deck is abnormal, based on a signal of the sensor generated according to movement of the light blocking parts.

7. The apparatus of claim 6, wherein the housing bushing is formed with a guide rib for preventing the movement of the housing busing.

8. The apparatus of claim 1, wherein, when insertion of a DVD disc is determined to be completed, based on a DVD player state signal during insertion of the DVD disc into a DVD player mounted in the DVD deck, the control module allows the DVD deck to automatically return to the internal space of the vehicle body trim panel.

9. The apparatus of claim 1, wherein the control module allows the DVD deck to move up and down based on a signal of an operation button, and the operation button is provided in a glove box.

* * * * *